July 15, 1958     E. F. McDONALD, JR     2,843,836

WARNING SIGNAL

Filed April 29, 1955     4 Sheets-Sheet 1

EUGENE F. McDONALD JR.
*INVENTOR.*

BY *Francis W. Crotty*

HIS ATTORNEY.

July 15, 1958  E. F. McDONALD, JR  2,843,836
WARNING SIGNAL

Filed April 29, 1955  4 Sheets-Sheet 2

EUGENE F. McDONALD JR.
*INVENTOR.*

BY *Francis W. Crotty*

HIS ATTORNEY.

July 15, 1958     E. F. McDONALD, JR     2,843,836
WARNING SIGNAL

Filed April 29, 1955     4 Sheets-Sheet 3

INVENTOR.
EUGENE F. McDONALD JR.
BY
HIS ATTORNEY.

July 15, 1958     E. F. McDONALD, JR     2,843,836
WARNING SIGNAL

Filed April 29, 1955     4 Sheets-Sheet 4

EUGENE F. McDONALD JR.
INVENTOR.

BY *Francis W. Crotty*

HIS ATTORNEY.

United States Patent Office 2,843,836
Patented July 15, 1958

2,843,836

WARNING SIGNAL

Eugene F. McDonald, Jr., Chicago, Ill.

Application April 29, 1955, Serial No. 504,857

2 Claims. (Cl. 340—87)

This invention is directed to a new and improved warning signal system for traffic-control vehicles such as police squad cars and the like.

It is a primary object of this invention to provide a warning signal system for a traffic-control vehicle which is completely inconspicuous except when in use.

It is a corollary object of the invention to provide a traffic-control warning signal which is effectively concealed within the body of a squad car when not in use.

It is a further object of the invention to provide a retractable traffic-control warning signal system which does not interfere with the driver's vision.

It is another object of the invention to provide a retractable traffic-control warning signal system which, in its extended position, provides maximum efficiency and coverage for the warning light.

A warning signal system for a traffic-control vehicle constructed in accordance with the invention comprises a signal light and support means therefor. The support means is actuatable between a retracted position in which the light source is concealed within the vehicle body and an extended position in which the light source is exposed for signalling purposes. An actuating system is provided to control extension and retraction of the signal light support means, and energizing means are provided for the signal light.

The features of the invention which are believed to be novel are set forth with particularity in the appended claims. The organization and manner of operation of the invention, together with further objects and advantages thereof, may best be understood by reference to the following description taken in conjunction with the accompanying drawings, in which:

Figure 1:
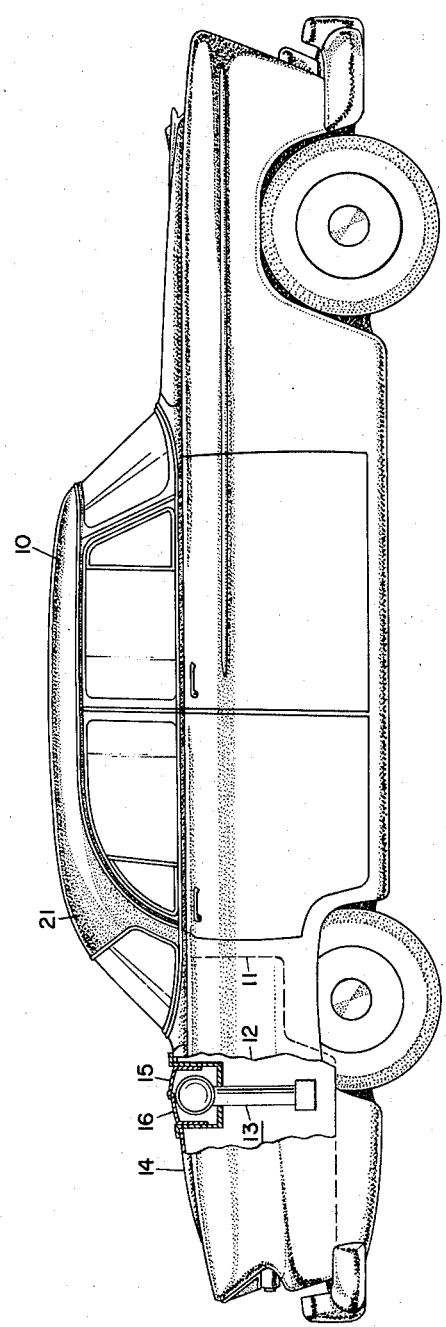
Figure 1 is a side view of a traffic-control vehicle in which a warning signal system constructed in accordance with the invention is mounted; a portion of the vehicle body is cut away to show the warning signal system in its retracted position.

Figure 1 shows a traffic-control vehicle or squad car 10 of conventional type; the trunk section of the automobile is indicated by dash line 11. A portion of the vehicle side is cut away at 12 to show a warning signal system 13 mounted within the trunk of the car; signal system 13 is suspended from the trunk lid 14. As indicated in the drawing, the warning signal system is effectively concealed within the trunk.

Figure 2:
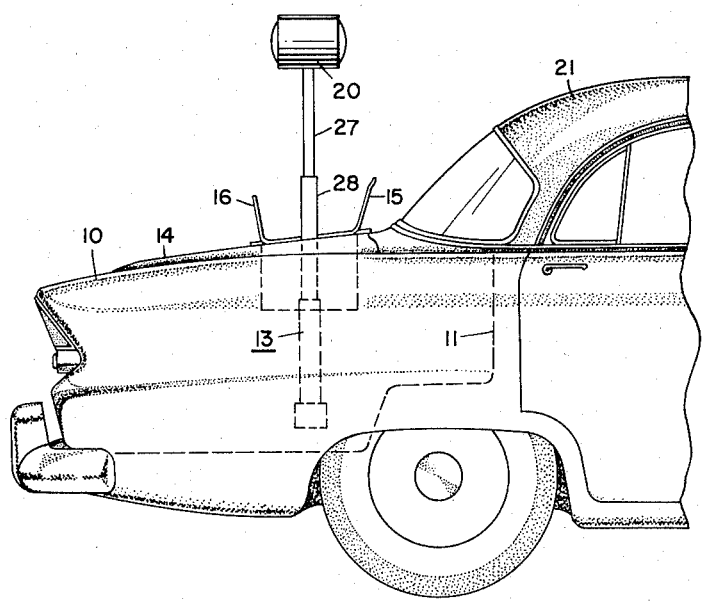
Figure 2 shows a portion of the vehicle of Figure 1 with the warning signal system in its extended or signalling position.

Figure 2 illustrates the rear portion of squad car 10 with warning signal system 13 in its extended position. As indicated in this figure, when the warning signal system is extended a signal light 20 is elevated above the roof 21 of the body section of the car so that it is readily visible from all directions. Protective covers 15 and 16 are moved aside as the light is extended; however, the operating mechanism of the warning signal system is still protected from the weather, as will be explained more completely hereinafter. Warning signal system 13 does not substantially interfere with the vision of the driver of car 10, since only a relatively thin tubular support extends across the driver's line of vision through the rear view mirror.

Figure 3:
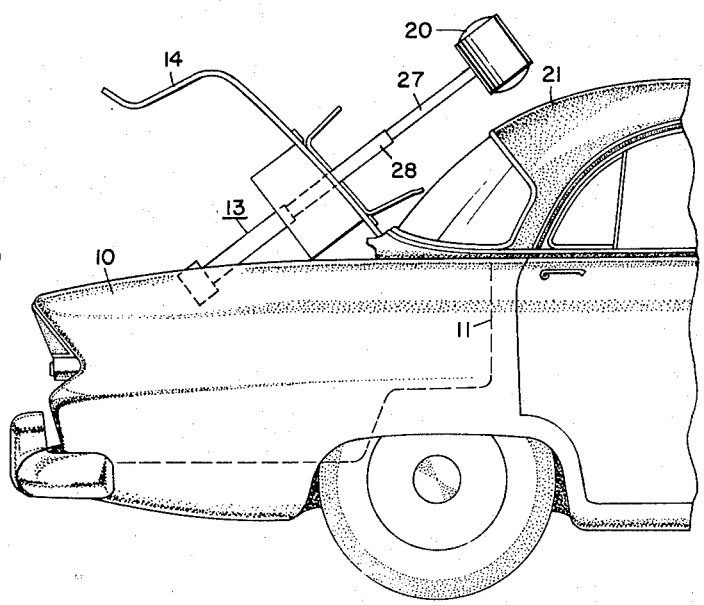
Figure 3 is another view of the vehicle of Figure 1 showing the warning signal system in its extended position with the trunk of the vehicle open.

Figure 3 shows the rear portion of squad car 10 with trunk lid 14 opened to allow access to trunk 11 and/or to permit servicing of the signal light mechanism. Warning signal system 13 is shown in its extended position to indicate the more-than-adequate clearance between signal light 20 and vehicle roof 21 when the trunk lid is opened with the signal light in operation. As is made apparent in this view, signalling can be carried out even with the trunk lid opened, since signal light 20 is still visible from all sides of the vehicle.

Figure 4:
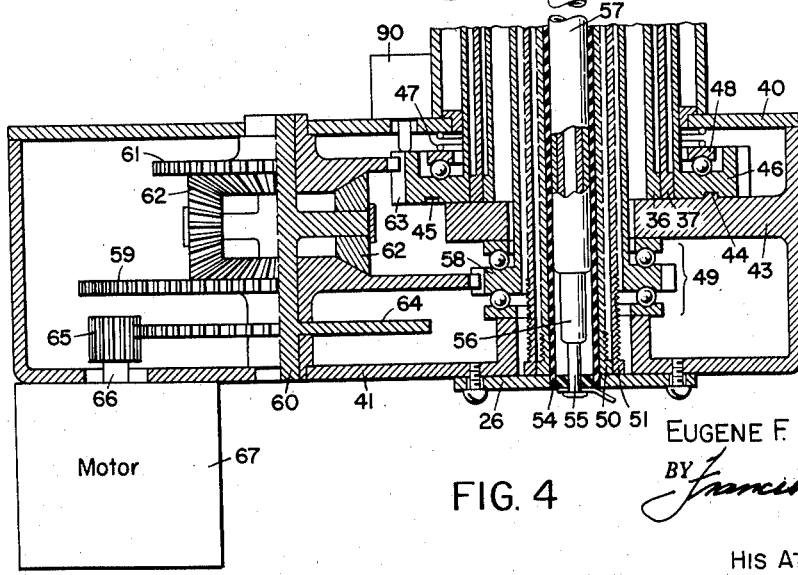
Figure 4 is an enlarged partial cross-sectional view, partly schematic, of the warning signal system shown in Figures 1–3 and illustrates a preferred form of actuating and driving mechanism.

Figure 4 shows warning signal system 13 in cross-sectional detail. Signal light 20 is mounted on a first threaded support member 22 by means of a mounting ring or collar 25; support member 22 comprises a relatively strong tubular element capable of supporting signal light 20 during high speed driving without exhibiting undue strain. The external surface of the support member constitutes a continuous screw thread. In its retracted position, as illustrated in Figure 4, member 22 is supported by a base member 26 and is telescoped within a second tubular threaded support member 23 which, in turn, is positioned within a third tubular support member 24. Support members 22—24 are the principal operating elements in the support means for light source 20 and may be actuated from their retracted position as shown in Figure 4 to the extended position illustrated in Figure 2 to expose light 20 for signalling purposes.

Figure 5:
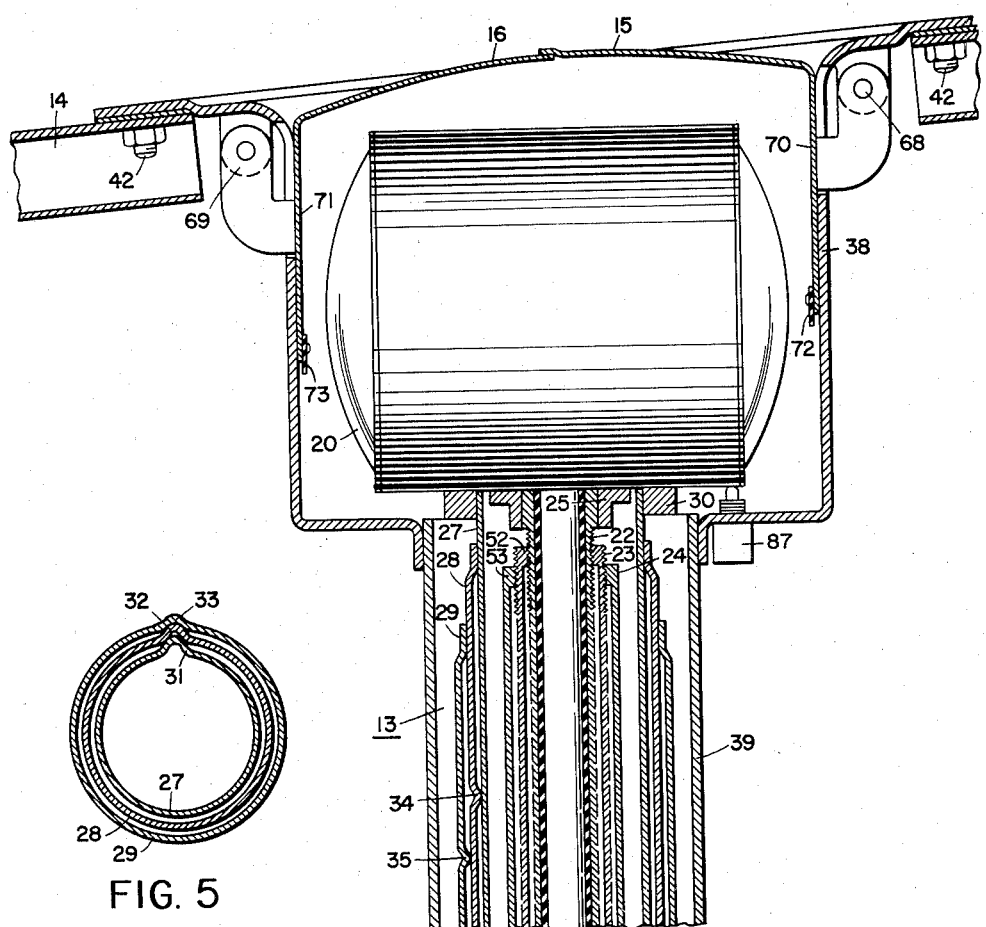
Figure 5 is a cross-sectional view of a portion of the apparatus of Figure 4, showing the keyed construction of the shield structure.

Support members 22—24 are mounted within a telescoping shield structure which is also used to rotate signal light 20 when in its extended position. The shield structure comprises a first tubular element 27 affixed to light 20 by means of a mounting collar 30; tube 27 is positioned within a second tubular shield member 28, which, in turn, is mounted within a third or outer shield tube 29. The three shield members 27, 28 and 29 are keyed to each other to permit axial movement of the three tubes with respect to each other without allowing relative rotational movement between them. This keyed construction may be achieved by forming axially extending interlocking keyways 31, 32, and 33 in shield tubes 27, 28, and 29 respectively, as indicated in Figure 5. The shield tubes are limited in their axial movement with respect to each other by means of a pair of internal stop elements 34 and 35 formed in tubes 28 and 29 respectively. As system 13 is extended, stops 34 and 35 are engaged by two flanges 36 and 37 on tubes 27 and 28 respectively to limit vertical movement of the shield members; this vertical indexing arrangement is shown in Figure 4.

When system 13 is in its retracted position, signal light 20, the elevating and support system comprising members 22—24, and the shield structure 27—29 are all mounted within a combination mounting bracket and protective enclosure comprising a signal light housing 38, a tubular section 39, and an actuating system housing 40 having a base 41. The uppermost portion of signal light housing 38 is secured to trunk lid 14 by a series of bolts 42 or by any other suitable means; thus, the entire warning signal system 13 is suspended from the trunk lid.

Housing 40 includes an internal support member 43 which serves to support shield structure 27—29; member 43 includes an index pin 44 adapted to engage any one of a series of index recesses 45 in the enlarged base section 46 of outermost shield tube 29. Base section 46 of tube 29 is urged into contact with support member 43 by a biasing spring 47 which bears against the top of housing 40; a suitable anti-friction bearing 48 is interposed between spring 47 and base section 46 to permit rotational movement of the shield structure.

Base member 26, which supports threaded support members 22 and 23, is affixed to base 41 of actuating system housing 40. The outermost tubular support member 24 is rotatably mounted within the housing by means of a double-thrust bearing 49, supported between members 41 and 43. The two internal threaded support members 22 and 23 are provided with base flanges 50 and 51 respectively; the base flanges are employed to limit upward travel of the tubular supports. The upper portions 52 and 53 of the two outer support members 23 and 24 are provided with internal threads adapted to cooperate with the screw threads on members 22 and 23 respectively.

The innermost support tube 22 is lined internally with an insulating sleeve 54. A three-section telescoping circuit structure comprising three members 55, 56 and 57 is mounted within insulator tube 54 to provide for energization of signal light 20. The innermost or lower section 55 of the circuit structure may comprise a wire or metallic rod provided with a suitable terminal for connection to a power supply; rod 55 extends axially of the central opening in support member 22. The two additional telescoping sections 56 and 57 are electrically and mechanically coupled to rod 55 and to each other; the outermost or upper section 57 is coupled to the proper terminal of signal light 20. The return circuit for the signal light may, of course, be made through the shield structure comprising tubes 27—29.

A spur gear 58 is mounted on the lower section of outer support member 24 and engages a second spur gear 59 journaled on a shaft 60 rotatably mounted in housing 40. Spur gear 59 comprises one of two driven elements in a differential mechanism including a similar but smaller driven gear 61 and a pair of differential driving gears 62 for gears 59 and 61. Gear 61 engages a plurality of gear teeth 63 formed in the periphery of base section 46 of shield tube 29; gear 61 is journaled on shaft 60. An additional spur gear 64 is affixed to shaft 60 and engages a pinion gear 65 mounted on the shaft 66 of a motor 67. In the illustrated embodiment, motor 67 is mounted externally of housing 40, although it may, of course, be positioned within the housing.

Figure 6:
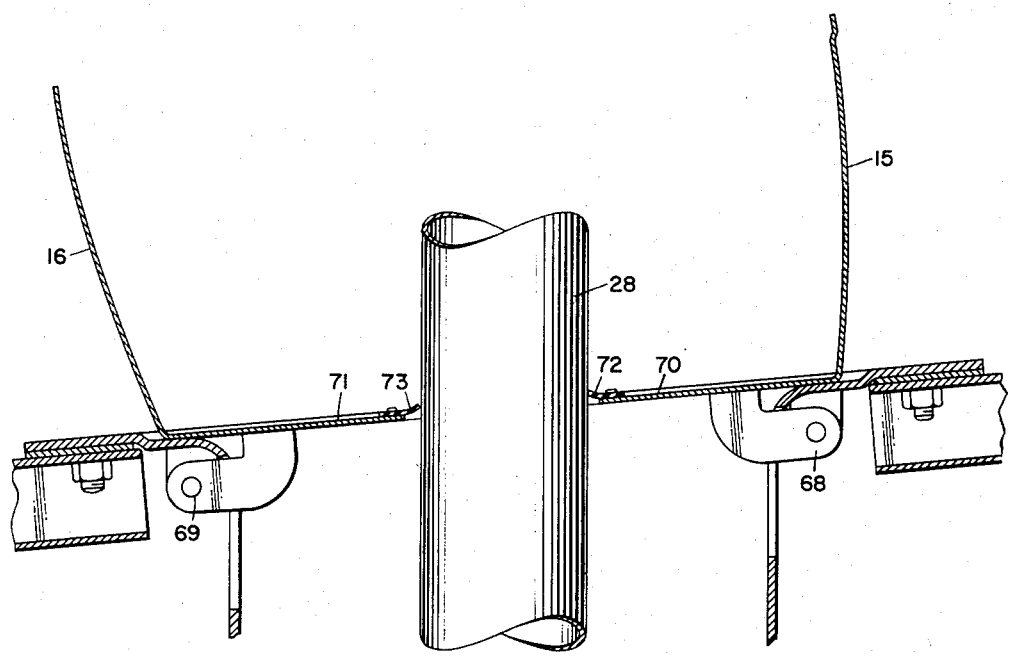
Figure 6 is a cross-sectional view of a portion of the apparatus of Figure 4 showing the position of the protective cover for the warning signal system in its extended position.

Figure 4 also shows a preferred construction for the protective covers 15 and 16 of signal light 20. The two protective covers are each substantially L-shaped in cross-section. Cover 15 is pivotally mounted on signal light housing 38 by means of a hinge 68; cober 16 is similarly mounted to the cone section by a hingle 69. The two covers are forced open whenever signal light 20 is extended; as the covers pivot on hinges 68 and 69, their internal sections 70 and 71 move inwardly to engage the shield structure of the support mechanism. The position of the covers with signal light 20 in its extended position is shown in Figure 6; as indicated therein, the support system for the signal light is protected from the weather by cover sections 70 and 71 when the light is extended for signalling. Cover extensions 70 and 71 may be provided with sealing elements 72 and 73 formed from rubber or similar material to provide a substantial seal with shield tube 28 and thus protect the signal light actuating system when it is extended during adverse weather conditions.

To extend warning signal system 13 from its retracted position illustrated in Figure 4, motor 67 is energized and rotates outer support member 24 through the mechanical driving connection provided by spur gear 58 and the differential comprising gears 59 and 62. At the outset, the other driving gear of the differential, gear 61, cannot rotate, since it is in mesh with gear teeth 63 of shield tube 29 and the shield tube is locked in position by engagement of index pin 44 in one of the apertures 45 in the shield tube base section. The rotational speed of support member 24 is made as high as possible consistent with good engineering practice, since in many situations it may be desirable to place the warning signal system in operation on short notice. As support member 24 is rotated, it forces threaded support 23 upwardly through the driving connection between threaded portion 53 of the support member and the external thread on support member 23. As support member 23 moves upwardly, flange 51 approaches the top portion 53 of member 24, and blocks further progress. The driving system then begins to extend the innermost threaded support member 22. Continued rotation of the support system moves signal light 20 out to its completely extended position.

When the support system 22—24 is extended, shield structure 27—29 is also moved to its extended position. As the support system reaches the end of its travel, flange 37 of shield tube 28 engages stop 35 on outer shield 29, so that tube 29 is lifted against the biasing force exerted by spring 47. Tube 29 moves upwardly through a distance sufficient to clear index pin 44; the shield structure is thus freed for rotational movement. Consequently, a portion of the driving force from motor 67 is now converted into relatively slow rotational movement of the shield structure by means of the driving connection established through gears 61 and 63. With the light in its extended position, all elements of the system rotate slowly, the speed of rotation being governed by the gear ratio established by the differential driving system and gear 63.

To retract warning signal system 13, it is only necessary to reverse the direction of rotation of motor 67. When this is done, the biasing force from spring 47 urges base 46 of shield member 29 downwardly, engaging index pin 44 in one of the slots 45. Engagement of the indexing members prevents further rotational movement of the shield structure and signal light 20, so that the signal light is rapidly retracted by means of the driving connection from the differential to spur gear 58.

Figure 7:
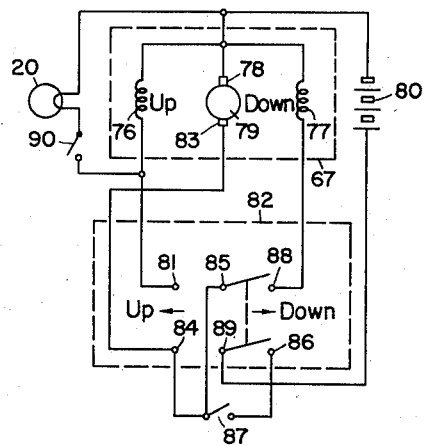
Figure 7 is a schematic wiring diagram of the electrical control system of the apparatus of Figure 4.

Figure 7 shows an electrical control circuit for the apparatus of Figure 4. Motor 67 in this instance comprises a D. C. motor of the familiar shunt variety using two separate field coils 76 and 77 which are counter-wound to provide for reversing the motor. Coil 76 represents the field coil used for rotation in one direction to drive warning signal system 13 toward it extended or "up" position and field coil 77 is utilized to drive the warming signal system back toward its retracted or "down" position. One terminal 78 of the armature 79 of motor 67 is connected to one terminal of each of windings 76 and 77 and to a battery 80 which may comprise a storage battery of a vehicle in which the warning signal system is mounted. The same motor terminal 78 is also connected to one terminal of signal light 20, here represented as an incandescent lamp. The other terminal of signal lamp 20 is connected through a limit switch 90 to the remaining terminal of field winding 76 and to one of the outer terminals 81 of a double-pole double-throw master control switch 82. The remaining terminal 83 of armature 79 is connected to one external terminal 84 and one internal terminal 85 of switch 82; armature terminal 83 is also connected to a second external pole 86 of switch 82 through a limit switch 87. Winding 77 is connected to the remaining external pole 88 of switch 82 and the second internal terminal 89 of switch 82 is connected back to battery 80.

Operation of the circuit shown in Figure 7 is quite simple and permits completely automatic control of the warning system from a remote location by means of a master control switch 82. When switch 82 is closed in the "up" position, armature 79 and field winding 76 are energized from battery 80. Signal light 20, however, is not immediately energized, since limit switch 90 is normally maintained open. When the signal light reaches its extended position, limit switch 90 is closed, completing the energization circuit for the signal light. Master switch 82 is left in the "up" position as long as use of the signal light is desired, since motor 67 provides for raising the signal light and also for rotating it in the extended position. When it is desired to retract signal warning system 13, master switch 82 is thrown to the "down" position in which the direction of rotation of motor 67 is reversed, since field coil 77 is energized instead of winding 76. With limit switch 87 closed, as is normally the case, motor 67 drives the warning signal system back to its retracted position. Signal lamp 20 is not energized as the system is being retracted, since limit switch 90 is opened as soon as the signal light starts to move toward its retracted position. Limit switch 87, on the other hand, is arranged to be open when signal light 20 returns to its rest position, thereby de-energizing the entire system. Thus, extension and operation of the signal warning system are both achieved simply by moving switch 82 to its "up" position and the system is retracted and de-energized merely by throwing the switch to its "down" position. Switch 82 may be mounted on the dash or in some other convenient location in vehicle 10 to provide complete control of the signal warning system in transit.

Limit switch 87 may be conveniently mounted on enclosure 38, as indicated in Figure 4, and may be operated directly by contact with signal light 20. Other arrangements for opening limit switch 87 when the signal light has returned to its retracted position may also be employed. Limit switch 90, on the other hand may be conveniently mounted on housing 40 and may be actuated by movement of base section 46 of shield member 29 as the light reaches it final extended position.

A signal warning system constructed in accordance with the invention is almost completely concealed when not in use. When placed in operation, on the other hand, it is positioned completely above traffic vehicle 10 and provides a warning indication in all directions. It permits the law enforcement officer to function without advertising his presence and thus facilitates improved traffic control.

While a particular embodiment of the present invention has been shown and described, it will be obvious to those skilled in the art that changes and modifications may be made without departing from the invention in its broader aspects. Accordingly, the aim in the appended claims is to cover all such changes and modifications as may fall within the true spirit and scope of the invention.

I claim:

1. A warning signal system for a squad car, said system comprising: a rotatable signal light; support means for said signal light, said support means being actuatable between a retracted position in which said signal light is concealed within the body of said squad car and an extended position in which said signal light is exposed for signalling purposes; an actuating system, including a motor for actuating said support means between said retracted and extended positions, for controlling the operation of said support means; rotational-motion-translating mechanical coupling means coupling said signal light to said motor when said support means is in said extended position to rotate said signal light at a relatively slow speed and provide intermittent omnidirectional signalling; and means for energizing said signal light.

2. A warning signal system for a squad car having a body section of predetermined height and a trunk section of substantially lesser height, said system comprising: a rotatable directional signal light; telescoping support means for said signal light, mounted within said squad car trunk section, said support means being actuatable between a retracted position in which said signal light is concealed within said trunk section of said squad car and an extended position in which said signal light is supported at a height substantially greater than the height of said body section for signalling purposes; and actuating system, including a motor for actuating said support means between said retracted and extended positions, for controlling the operation of said support means; mechanical coupling means coupling said signal light to said motor when said support means is in said extended position to rotate said signal light at a relatively slow speed and provide intermittent omnidirectional signalling; and means for energizing said signal light.

References Cited in the file of this patent

UNITED STATES PATENTS

| | | |
|---|---|---|
| 1,472,592 | Fox | Oct. 30, 1923 |
| 2,057,760 | Binder | Oct. 20, 1936 |
| 2,121,685 | Crocker | June 21, 1938 |
| 2,158,973 | Whenham | May 16, 1939 |
| 2,292,698 | Kalisz | Aug. 11, 1942 |
| 2,578,239 | Gosswiller | Dec. 11, 1951 |
| 2,603,700 | Martin | July 16, 1952 |
| 2,665,418 | Miller | Jan. 5, 1954 |
| 2,738,492 | Arneson et al. | Mar. 13, 1956 |